INVENTOR
Arnold D. Siedle
William H. Kitto
BY Harry S. Demarse
ATTORNEY

Nov. 11, 1941.   A. D. SIEDLE ET AL   2,262,656
REFRIGERATION
Filed Aug. 21, 1937   5 Sheets-Sheet 2

INVENTOR
Arnold D. Siedle
William H. Kitto
BY
Harry S. Dumars
ATTORNEY

Nov. 11, 1941.  A. D. SIEDLE ET AL  2,262,656

REFRIGERATION

Filed Aug. 21, 1937  5 Sheets-Sheet 3

INVENTOR
Arnold D. Siedle
William H. Kitto

BY Harry S. Dunaver
ATTORNEY

Nov. 11, 1941.   A. D. SIEDLE ET AL   2,262,656
REFRIGERATION
Filed Aug. 21, 1937   5 Sheets-Sheet 5

INVENTOR
Arnold D. Siedle
William H. Kitto
BY
Harry S. Demarsz
ATTORNEY

Patented Nov. 11, 1941

2,262,656

UNITED STATES PATENT OFFICE 2,262,656

REFRIGERATION

Arnold D. Siedle and William H. Kitto, Canton, Ohio, assignors to The Hoover Company, North Canton, Ohio, a corporation of Ohio Application August 21, 1937, Serial No. 160,274

26 Claims. (Cl. 62—5)

This invention relates to continuous absorption refrigerating systems and more particularly to control apparatus for such systems. Continuous absorption refrigerating systems operated by heat and an electrical motor or the like for circulating inert gas therein are well known. It has been proposed to provide such a continuous system with a heater for the boiler operated by gas or the like, and to provide an electrical motor for driving a fan or other device for circulating the inert gas between the evaporator and the absorber.

It is an object of the present invention to provide a novel control means for a continuous absorption refrigerating system which will insure proper action of the system at all times.

It is a further object of the invention to provide a control for a continuous absorption refrigerator which will insure proper defrosting control under various conditions.

It is a further object of the invention to provide a convenient arrangement of the control for the heater and circulator for a continuous absorption refrigerating system.

It is an object of one form of the invention to provide a system wherein warm refrigerant liquid collects in the evaporator during the defrosting period to hasten the melting of the ice formed on the evaporator.

It is a further object of the invention to provide a control mechanism for a continuous three-fluid absorption refrigerating system provided with a power-driven inert gas circulating means which will simultaneously regulate the generator heat input and control the power-driven circulating means.

It is a further object of the invention to provide a control mechanism which will control a motor and a modulating gas valve in response to the condition of a mechanism to be controlled.

It is a further object of the invention to provide a novel and efficient defrosting mechanism.

It is a further object of the invention to provide a control which permits the housewife to shut off the machine while the evaporator is being cleaned, shelves removed, or the box cleaned without removing the electric plug or shutting off the gas valve.

It is a further object of the invention to provide a control for continuous absorption refrigerating system which allows warm liquid refrigerant to collect in the evaporator during defrosting in order to hasten the defrosting process but which will automatically produce some refrigeration at the end of the defrosting period even though the housewife has neglected to set the control back to a normal controlling position.

It is a further object of the invention to combine a novel defrosting mechanism with a thermal responsive device.

Other objects and advantages reside in the novel arrangements of parts and constructional features as will be apparent from the following description taken in connection with the accompanying drawings, in which:

Figure 7A is a wiring diagram of the control mechanism of Figures 6 and 7.

Figure 1:
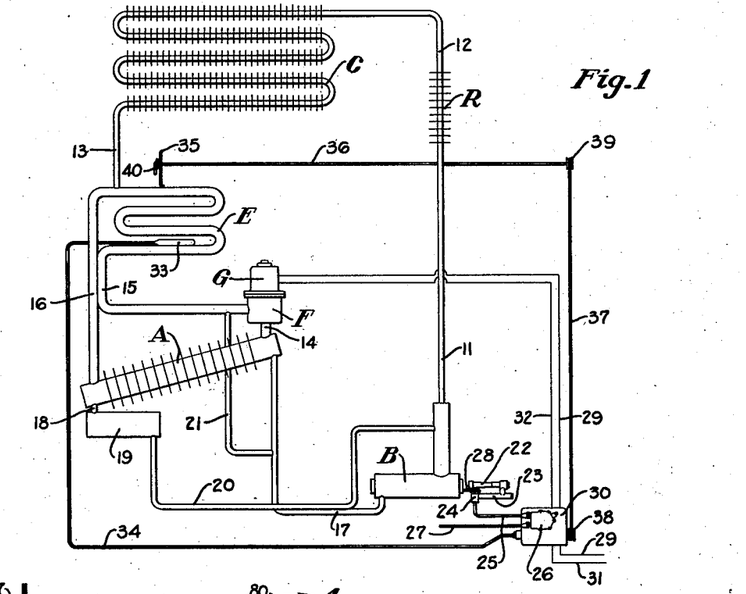
Figure 1 is a diagrammatic representation of a continuous absorption refrigerating system using inert gas and having a gas circulating fan driven by an electric motor. The diagram also illustrates the control mechanism.

Referring to the drawings in detail and first to Figure 1 thereof, it will be apparent that a continuous absorption refrigerating system is diagrammatically illustrated as comprising a boiler B, a rectifier R, a condenser C, an evaporator E, a circulating fan F driven by a motor G, and an absorber A. These elements are connected by various conduits to form a continuous absorption refrigerating system including a number of liquid and gas circuits.

The above described refrigerating system will preferably be charged with a suitable refrigerant, such as ammonia, a suitable absorbent therefor, such as water, and an inert pressure equalizing medium, preferably a dense inert gas like nitrogen.

The refrigerant circuit comprises a conduit 11 connecting the boiler B and the rectifier R, a conduit 12 connecting the rectifier R and the condenser C, and a conduit 13 connecting the condenser C and the evaporator E. The boiler B is heated by suitable means to be described hereinafter and generates refrigerant vapor which passes through conduit 11 to the rectifier R wherein the refrigerant vapor is freed of entrained water vapor which condenses and flows backwardly through conduit 11 to the boiler B. The substantially pure refrigerant vapor is conducted from the rectifier R by way of conduit 12 to the condenser C where it is liquefied. The liquid refrigerant is discharged through the conduit 13 into the evaporator E.

The inert gas circuit comprises a conduit 14 leading from the upper end of the absorber A into the suction inlet of the fan F, a conduit 15 leading from the discharge side of fan F to the lower end of the evaporator E, and a conduit 16 leading from the upper end of the evaporator E to the lower end of the absorber A. The conduits 15 and 16 are preferably in heat exchange relation as illustrated. The liquid refrigerant discharged into the evaporator E through the conduit 13 vaporizes in the presence of the inert gas supplied to the evaporator E through the conduit 15 and the vapor-gas mixture is conveyed to the absorber A by the conduit 16. In the absorber A the refrigerant vapor is absorbed by absorption liquid supplied by a system to be described hereinafter and the remaining inert gas is returned to the evaporator through the conduit system 14-15. The inert gas may be of any desired character, but a dense gas such as nitrogen is preferred.

The solution circuit comprises a conduit 17 leading from the boiler B to the upper end of the absorber A. A conduit 18 connects the absorber A with a liquid reservoir 19 which is connected to the boiler B by means of conduit 20. Conduits 17 and 20 are in heat exchange relation as illustrated. The weak liquor formed in the boiler after removal of the refrigerant vapor by application of heat is conveyed to the absorber by way of the conduit 17. A gas lift pump is provided in the conduit 17 to elevate the weak liquor to the absorber. This gas lift pump is shown as comprising a conduit 21 connected to the discharge side of the fan F and to the conduit 17 at a point below the balancing liquid column in the boiler B. If desired the gas lift pump may be replaced by the well known heat operated vapor lift pump. The absorber A may be of any suitable construction to provide efficient gas and liquid contact. The strong liquor is discharged from the absorber through the conduit 18 into the reservoir 19 and is returned to the boiler through the conduit 20.

It is to be understood that the refrigeration system just described is to be taken as illustrative only and not in a limiting sense. The present invention is also very advantageous when applied to a system wherein the absorption fluid is circulated by means of a vapor lift pump operated by the heat supplied to the boiler and the inert gas is circulated by gravity, the fan F being utilized only when the refrigeration demand is very great. In this type of apparatus the refrigerant, absorbent and inert gas will be ammonia, water and hydrogen, respectively, in accordance with known practice.

Figure 1 also illustrates diagrammatically the control mechanism applied to this invention. The boiler B is heated by a gas burner 22 which receives its supply of gas through a conduit 23, safety valve 24, conduit 25, modulating valve 26, and supply line 27. The modulating valve is provided with a pilot flame by-pass as will be described more fully hereinafter. The safety valve 24 is of the thermostatic type and is provided with a thermal device 28 positioned to be heated by the burner flame. The structure is such that a small amount of gas will be fed to the burner 22 even when valve 26 is in the "off" position. This will support a small flame of the burner 22 sufficient to heat the thermal device 28 and maintain the valve 24 in "open" position. In case of flame failure the thermal device 28 will cool and the valve 24 will shut off all gas supply to the burner 22. In some instances it may be desirable to provide a separate pilot burner for the ignition flame in which event the gas valve 24 would be positioned in the line 27 ahead of the valve 26 and the pilot burner would be taken off between the valves 24 and 26 and be positioned both to heat the thermal element 28 and to ignite the burner 22.

The motor G is supplied with electric current by the supply lines 29 and 31. The line 31 passes into a control mechanism indicated generally at 30 which includes a control switch to be more fully described hereinafter, and then continues through the line 32 to the motor G. The line 29 is connected directly to the motor G.

The control mechanism 30 may be positioned at any convenient point. The mechanism 30 is designed to be responsive to the evaporator temperature and to that end it is provided with a thermal bulb 33 connected by conduit 34 to a thermally responsive mechanism to be more fully described hereinafter. The control mechanism 30 is designed to be regulated from a control panel positioned adjacent the evaporator or at any other convenient point. For purpose of illustration, the control panel 35 is shown as being mounted above the evaporator E. The control panel 35 is pierced by a control shaft 36 carrying a drive pulley 39 which is connected by means of a cable mechanism 37 to a pulley 38 mounted on the control mechanism 30. A control knob 40 is mounted on one end of shaft 36 and in front of the panel 35.

Referring now to Figures 2 to 5 it will be seen that the control mechanism is illustrated in detail. The control mechanism includes a housing 41 which may be mounted on the machine frame or on the boiler insulating box or in any other suitable place. The modulating gas valve 26 is mounted on one side of the control housing 41 and is provided with a control shaft 42 projecting thereinto. The snap acting control switch for the motor G, which is connected to the wires 31 and 32, is indicated at 43, and is supported in any suitable manner within the housing 41.

Figure 2:
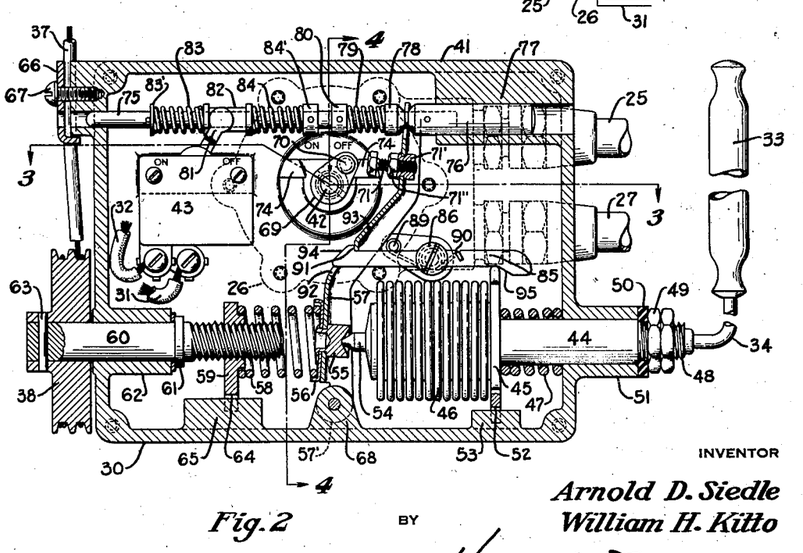
Figure 2 is a detail view illustrating one form of control mechanism.
Figure 3:
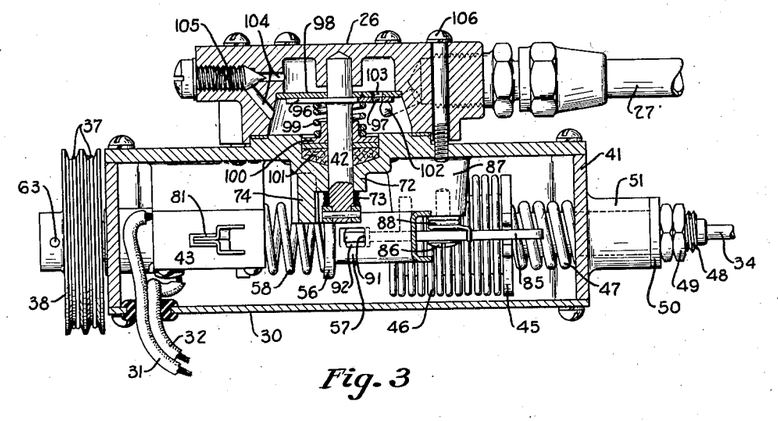
Figure 3 is a detail view taken along the line 3—3 of Figure 2.

The gas valve and control switch are operated by a thermal mechanism which is constructed in a manner now to be described. The conduit 34, which connects the evaporator bulb to the thermal mechanism, joins with a mounting and connecting element 44 which is rigidly connected to the end wall 45 of an expansible thermal bellows 46. A stiff spring 47 is interposed between the end wall 45 of the bellows and the end wall of the housing 41. The mounting and connecting element 44 is provided with a reduced threaded end portion 48 which connects directly to the conduit 34. A pair of lock nuts 49 are mounted on the portions 48 and serve to position and retain a rubber washer 50 which bears against the end of the enlarged mounting and connecting element 44 and the end portion of a bearing sleeve 51 formed integrally with the end wall of housing 41 and slidably receiving the element 44. The end wall 45 of the bellows 46 is provided with a downwardly extending portion provided with a slot 52 engaging a guide lug 53 formed integrally with housing 41.

The end of the bellows opposite to the wall 45 is provided with a hardened steel bearing point 54 which seats in a complementary bearing cup 55. The bearing cup 55 is riveted over as shown and serves to secure itself and a spring retaining cup 56 to an actuating arm 57. A temperature range adjusting spring 58 is interposed between the retaining cup 56 and an adjusting nut 59 carried on the threaded end portion of an adjusting shaft 60. The adjusting shaft 60 is provided with an enlargement 61 bearing on a hardened steel washer which bears on an inwardly extending sleeve 62 formed integrally with the end wall of housing 41. The enlargement 61 serves to prevent lateral displacement of shaft 60 under the bias of spring 58. The shaft 60 extends through the sleeve 62 and carries the pulley 38 at its outer end. The pulley 38 is rigidly secured to the shaft 60 by means of a pin 63. The adjusting nut 59 is provided with a downwardly extending portion having a slot 64 engaging a lug 65 whereby to prevent rotation of the nut 59 with the adjusting shaft 60.

The pulley 38 receives the cable 37 which is connected to the pulley 39 on the control shaft 36 as previously described. The cable 37 is anchored to the housing 41 by means of a retaining plate 66 which is secured to the housing 41 by a screw 67.

The actuating arm 57 is provided with a pair of downwardly extending ears 57' which are pivotally mounted on a lug 68 formed integrally with the bottom wall of the housing 41.

The gas valve control shaft 42 is provided with a small crank arm 69 having a small crank pin 70 positioned to be abutted by an adjusting screw 71. The screw 71 is threaded in a non-rotatable nut 71' on actuating arm 57 and is held in adjusted position by the lock nut 71''. Thus it will be seen that movement of the arm 57 induced by the bellows 46 will be transmitted through the crank 69 to the gas valve to regulate the quantity of gas being supplied to the burner 22. The control shaft 42 is rotatably mounted in an inset sleeve portion 72 formed integrally with the side wall of the housing 41. A small torsion spring 73 is wrapped around the shaft 42 between the crank 69 and the inner end of the sleeve 72 and is positioned to urge the gas valve to the "off" position. The bearing sleeve 72 is provided with a pair of outwardly projecting stop elements 74 positioned to be abutted by the crank arm 69 and to thereby determine the "full on" and "off" positions of the gas valve 26.

The free end of the actuating arm 57 is slotted and receives a motor switch actuating shaft 75 which is slidably mounted in the housing 41 in a manner to be described hereinafter. The actuating arm 57 bears at one side against an enlarged portion 76 of the shaft 75 which is slidably mounted in a bearing portion 77 formed integrally with the housing 41. At its opposite side the actuating arm 57 bears against a slidable collar 78 which is urged toward the enlargement 76 by a stiff lost motion take-up spring 79 bearing against a collar 80 rigidly attached to the shaft 75. The motor switch 43 is provided with a forked actuating arm 81 which is positioned to be actuated by the end shoulders of a collar 82 slidably mounted on the shaft 75. The collar 82 is held in position by a pair of stiff cushioning springs 83 and 84 which bear against abutments 83' and 84', respectively, fixed to the shaft 75. In operation the spring 79 acts as a rigid connection, its function being principally to prevent lost motion between the actuating arm 57 and the control shaft 75. The springs 83 and 84 normally function as rigid connections, their principal function being to prevent damage to the switch in the event that the arm 57 should override the end points of movement for the arm 81 in either direction. The distance between the end shoulders of the collar 82 is greater than the width of the forked arm 81 in order to permit the switch arm 81 to snap with the switch contacts within the switch 43.

The defrosting mechanism for this form of the invention is designed to lock the arm 57 with the switch 43 and the gas valve 26 both in the "off" position. The defrosting mechanism comprises a lock-out arm 85 pivotally mounted on a headed pin 86 which is rigidly carried in any suitable manner by a lug 87 formed integrally with the housing 41. A torsion spring 88 is wrapped about the pivot pin 86 between the end of the lug 87 and the lockout arm 85. One end of the torsion spring 88 is secured to a pin 89 rigidly mounted in the lug 87. The outer end of the torsion spring 88 is secured in a small slot 90 formed in the lockout arm 85. One end of the lock-out arm 85 is formed with a latching head 91 which is adapted to pass through a slot 92 formed in the actuating arm 57 and to latch with a downturned flange 93 formed on one margin of the cut-out 92. The forward end of the latching head 91 is tapered as indicated at 94 in order to permit the flange 93 to swing the lock-out arm 85 counter-clockwise, as viewed in Figure 2, against the bias of the spring 88 to permit the latching head 91 to engage the flange 93. The opposite end of the lock-out arm 85 is provided with a downwardly inclined surface 95 which is in engagement with the end wall 45 of the thermal bellows 46. By reason of this construction, movement of this wall 45 to the right as viewed in Figure 2 will swing the lockout arm 85 in a counter-clockwise direction and release the latching engagement between the flange 93 and the latching head 91.

The defrosting mechanism of this invention is not limited to the specific form of control mechanism illustrated herein. For example, it may be applied to the control mechanism illustrated in the co-pending application of Curtis C. Coons, Serial No. 148,424, filed June 16, 1937, now Patent No. 2,228,343, issued January 14, 1941.

Figure 4:
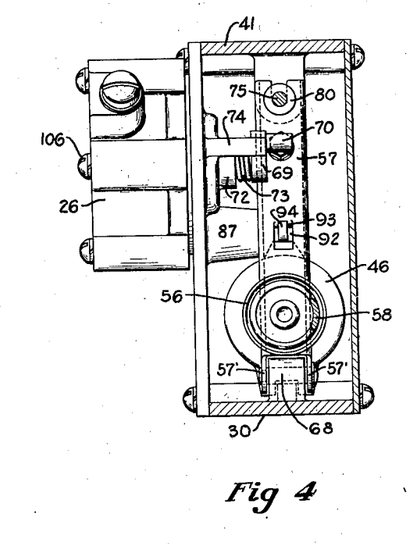
Figure 4 is a detail sectional view taken on the line 4—4 of Figure 2.

The gas valve 26 is of the modulating type and comprises a valve disc 96 formed integrally with the valve shaft 42 and provided with one or more tapered gas passages 97. The valve disc 96 bears upon a valve plate 98 and is urged thereagainst by a compression spring 99 seating at one end against the valve disc 96 and at its opposite end against a packing retaining plate 100 which bears upon packing material 101 placed in a recess formed in the end wall of the housing 41 and outwardly of the bearing sleeve for the shaft 42. Gas is supplied from any suitable form of pressure regulator by the conduit 27 and enters the valve housing through the passage 102 on the side of the valve disc adjacent the control mechanism housing. The gas passes through the passage or passages 97 in the valve plate 96, through one or more passages 103 in the valve plate 98 and then exits from the valve housing to the burner through the conduit 25. The usual pilot by-pass is provided and is indicated at 104. The pilot by-pass is provided with a small adjusting valve 105. The valve 26 is suitably secured to the control housing 41 by means of screws 106 as illustrated.

Figure 5:
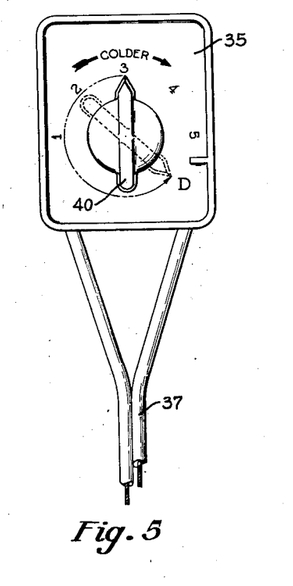
Figure 5 is a view of the control panel.

Figure 5 illustrates the control panel and the control knob for the mechanism of Figures 1 to 4. The control knob 40 is shown as being elongated and pointed at one end. The pointed end is adapted to cooperate with suitable indicia formed on the control panel 35 to indicate the temperature setting of the machine. The control panel 35 is also marked "D" to indicate the defrosting position of the controller. Any suitable stop means may be provided to prevent the knob 40 from being moved to the point "D" except by a counter-clockwise rotation as viewed in Figure 5. Movement of the control knob 40 is transmitted through mechanism, previously described, to the control mechanism.

The operation of this form of the invention will now be described. Rotation of the control knob 40 is transmitted to the adjusting shaft 60 which in turn advances or retracts the adjusting nut 59 and thus varies the compression of the adjusting spring 58 to adjust the temperature necessary to effect a given degree of expansion of the bellows. During normal operation, the bellows 46 responds to evaporator temperature changes and expands or contracts synchronously with such changes. Expansion of the bellows 46 corresponding to a demand for refrigeration swings the actuating arm 57 counter-clockwise as viewed in Figure 2 against the compression of the spring 58. Counter-clockwise movement of the arm 57 causes the screw 71 to abut the crank pin 70 whereby the modulating valve is moved to the "on" position. The switch 43 is moved to the "on" position by the arm 57 through the shaft 75, collar 82 and spring 84. When the evaporator temperature decreases the bellows contracts and slowly decreases the gas supply. When the evaporator has reached a very low temperature the gas valve and motor are shut off.

The gas valve and the motor control switch of this control mechanism may be adjusted to operate in a variety of different ways. With a refrigerating mechanism of the type illustrated in Figure 1 the adjustment should be such that the motor switch would normally be in the "on" position and accurate temperature control achieved by modulation of the gas valve which would be permitted due to the lost motion in the switch itself and by the distance between the end shoulders of the collar 82. With this type of control very efficient operation of the machine and very accurate control of its temperature is achieved. If a refrigeration system of the type utilizing a vapor-lift pump to circulate the absorption solution and a power-driven fan to circulate the inert gas is combined with the control mechanism illustrated in Figures 1 to 5, the system may be controlled in the manner just described in connection with Figure 1 or it may be so adjusted that the circulating fan operates only when the refrigeration demand is high; that is, the circulating fan is normally inoperative, and the inert gas is circulated by the difference in density between the gas streams entering and leaving the evaporator, but the fan is brought into operation when the refrigeration demand is such as to cause very high capacity at the evaporator. In this event the gas valve would be open to provide a reasonably high flame before the circulating fan would be placed in operation. Thus at high capacity the fan would be operating and accurate control would be achieved by modulation of the gas valve.

In order to defrost, the control knob 40 is turned to the defrost position, as indicated in Figure 5, and is then returned to any normal controlling position. Movement of the knob 40 to the defrost position advances the adjusting nut 59 to such an extent that the compression of spring 58 is sufficient to swing the actuating arm 57 in a clockwise direction, as viewed in Figure 2, against the pressure of the bellows until the flange 93 rides over the inclined surface 94 and is latched by the latching head 91. In this position the actuating arm 57 is rigidly locked against counter-clockwise movement. With the actuating arm 57 locked in the defrosting position, the motor switch is in the "off" position and the gas valve is in the "off" position being urged thereto by the torsion spring 73. With the refrigerating mechanism thus inoperative, the evaporator eventually warms up to a temperature sufficiently high to melt all the frost therefrom. While the evaporator is defrosting, the bellows 46 will expand against the compression of the stiff spring 47 but in a direction opposite to its normal direction of movement. This movement of the bellows 46 will cause the end plate 45 to bear on the inclined surface 95 and will swing the lock-out arm 85 in a counter-clockwise direction as viewed in Figure 2. Movement of the arm 85 in a counter-clockwise direction releases the latching engagement between the elements 91 and 93. Immediately the latching engagement between the elements 91 and 93 is released, the spring 47 shifts the bellows and its end plate bodily to the left as viewed in Figure 2 until the rubber washer 50 abuts the outer end of the supporting sleeve 51. The bellows is then in its normal position and, as the evaporator is at a high temperature and demanding refrigeration, the bellows then swings the arm 57 in a counter-clockwise direction to close the switch 43 and open the gas valve 26 in the normal manner.

Figure 6:
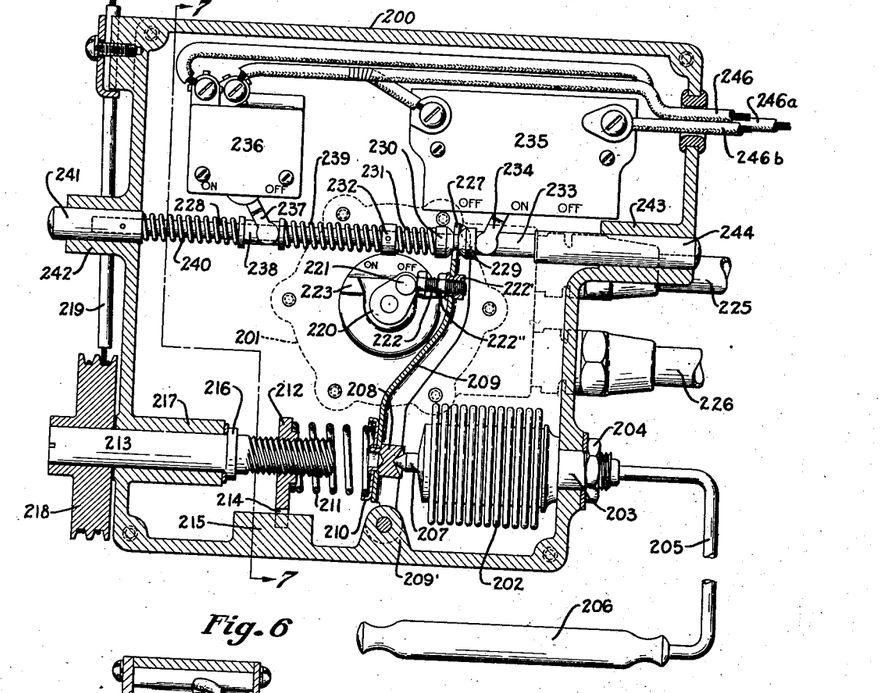
Figure 6 is a detail sectional view of another form of the invention.
Figure 7:
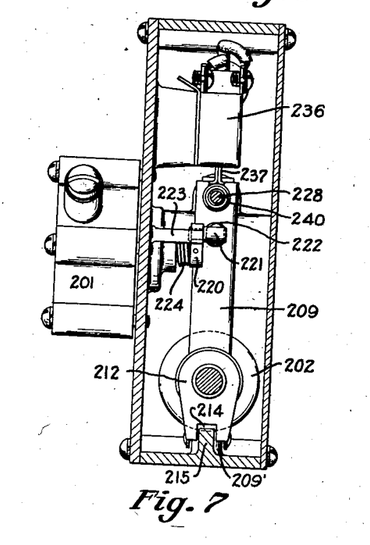
Figure 7 is a sectional view taken along the line 7—7 of Figure 6.

Figures 6, 7 and 7A disclose a modification of the invention which will now be described. This form of the invention is designated to be utilized with the refrigeration system illustrated in Figure 1 or with a refrigeration system utilizing a fan to circulate the inert gas at high loads and a vapor-lift pump to circulate the absorption liquid.

The control mechanism is encased within a housing 200. A modulating gas valve 201, which is similar to the valve 26 previously described, is carried on one side of the housing 200. An expansible bellows 202 is rigidly mounted by means of a connecting conduit 203 which is threaded at its outer end and carries a nut 204 bearing against the outer wall of housing 200. The connecting conduit 203 communicates with a conduit 205 which communicates with a thermal bulb 206. The bulb 206 may be mounted either in the refrigerating compartment or on the evaporator. The free end of the bellows is provided with a bearing point 207 which bears in a bearing cup 208. The bearing cup 208 is riveted over at one side which serves to secure the cup 208 and a spring retaining cup 210 to an actuating arm 209, which is pivotally mounted on a lug 209' formed integrally with the bottom wall of the housing 200.

An adjusting spring 211 is interposed between the spring retaining cup 210 and an adjusting nut 212 which is carried on the threaded end of an adjusting shaft 213. The adjusting nut 212 is provided with a downwardly extending portion having a slot 214 engaging a lug 215 formed integrally with the bottom wall of the housing 200 to prevent rotation of the nut. The adjusting shaft 213 is provided with an integral enlargement 216 bearing upon a hardened steel washer which bears on the outer end of a bearing sleeve 217 formed integrally with the end wall of housing 200 and rotatively receiving the adjusting shaft 213. The outer end of the adjusting shaft 213 has rigidly attached thereto a pulley 218. A cable 219, corresponding to the cable 37 previously described, is wrapped around the pulley 218. This cable is controlled from a control knob located adjacent the evaporator or at any other suitable point similarly to the manner in which the pulley 38, previously described, is controlled.

The modulating gas valve 201 is provided with a crank arm 220 within the housing 200. The crank arm is provided with a crank pin 221 positioned to be abutted by an adjusting screw 222. The screw 222 is received in a nut 222' rigid with the arm 209 and is locked in position by a lock nut 222''. The side wall of the housing 200 is formed with suitable stops 223 which are positioned to be abutted by the crank arm 220 and which define the "off" and "full on" positions of the modulating valve 201. A torsion spring 224, corresponding to the torsion spring 73, is mounted on the control shaft of the modulating valve 201 and urges the valve into the "off" position.

The gas conduits 225 and 226 correspond respectively to the gas conduits 25 and 27 previously described.

The free end of the actuating arm 209 is slotted as indicated at 227 and receives a motor control shaft 228. The actuating arm 209 bears at one side against an enlargement 229 formed integrally with the shaft 228. At its opposite face the actuating arm 209 bears against a collar 230 slidably mounted on the shaft 228. The collar 230 is urged against the actuating arm 209 by a stiff spring 231 which abuts a collar 232 fixed to the shaft 228. Rearwardly of the enlargement 229 the shaft 228 is provided with an elongated reduced portion 233 which receives the actuating arm 234 of a three-position switch 235 to be more fully described hereinafter. The actuating arm 234 is positioned to be contacted by the shoulders on the shaft 228 defining the end portion of the elongated reduced portion 233. The shaft 228 is also designed to actuate a normal motor control switch 236 which is provided with an actuating arm 237 positioned to be engaged by the end shoulders of a collar 238 slidably mounted on the shaft 228. The collar 238 is abutted at one side by a stiff spring 239 interposed between it and the fixed collar 232. At its other side the collar 238 is abutted by a similar stiff spring 240 interposed between it and a large bearing member 241 rigidly attached to the end of the shaft 228. The shaft 228 is slidably mounted at one end by means of the member 241 which is received by a bearing portion 242 formed integrally with one end wall of the housing 200; the opposite end of the shaft is supported by the enlarged bearing member 244 which is mounted in a bearing sleeve 243 formed integrally with the opposite end wall of the housing 200.

In this form of the invention the housing 200 is mounted similarly to the housing 41 previously described.

The inert gas circulating motor G receives power directly from one side of a power supply line 245. The other side of the line 246 is connected to the switches 235 and 236 as shown in Figure 7A. The switches are connected to the motor G by the wires 246a and 246b. The switch 235 is a three-position switch; that is, it is provided with a central "on" position and two "off" positions.

The collar 238 and the reduced portion 233 of the shaft 228 are so positioned with respect to one another that the switch 235 is normally in the lefthand "off" position, as viewed in Figure 6. The switch 236 is permitted some lost motion by the collar 238 in order to permit it to snap from "on" to "off" position or vice versa.

The operation of this form of the invention will now be described. The control knob may be the same as that indicated in connection with Figures 1 to 5 and may be connected to the pulley 218 and the cable 219 in the same manner in which it is connected to the cable 37 and the pulley 38 in Figure 1. Rotation of the control knob advances or retracts the adjusting nut 212 thereby varying the compression of the spring 211 with the result that the temperature range of the apparatus is changed. Expansion of the bellows 202 in response to a rising temperature condition of the evaporator swings the actuating arm 209 in a counter-clockwise direction, as viewed in Figure 6, and snaps the switch 236 to the "on" position, thus energizing the circulating fan motor, and moves the modulating valve to the "open" position due to the contacting relationship existing between the crank pin 221 and the adjusting screw 222. In normal operation switch 235 is in the lefthand "off" position, as viewed in Figure 6, and plays no part in the control of the apparatus. This is possible due to the fact that switch 235 is connected in parallel with the normal control switch 236.

The control mechanism of Figures 6 and 7 may be utilized to control a refrigerating system of the type illustrated in Figure 1 in which event the normal control will be identical with that described in connection with Figures 1 to 5. This mechanism may also be utilized to control a refrigerating system of the type utilizing a vapor lift pump operated by the boiler to circulate the absorption liquid and an inert gas circulating fan to circulate the inert gas. In this event the control mechanism will function exactly as described in connection with Figures 1 to 5 when applied to such a system.

When it is desired to defrost, the control knob is turned to the defrosting position, such as the position indicated at D in Figure 5, with the result that the nut 212 is moved to the right as viewed in Figure 6 and develops sufficient pressure to swing the arm 209 clockwise against the compression of the bellows. When the control knob is moved to defrosting position the arm 209 is shifted in a clockwise direction a sufficient distance to move the switch 235 through the central "on" position to the right hand "off" position as viewed in Figure 6. The defrosting controller is then left in the defrosting position and, the machine then being entirely inoperative, the temperature of the evaporator increases to such an extent that all frost is melted therefrom. This position also provides a ready means for temporarily rendering the machine inoperative without defrosting or interfering with the gas and electrical connections. When the evaporator has defrosted it has reached a temperature sufficiently high to cause the bellows 202 to expand against the compression of spring 211 and swing the switch 235 to the "on" position with the result that the gas valve is in closed position but the motor is now energized. With this method of operation the inert gas which circulates through the machine will evaporate the amount of liquid refrigerant collecting in the evaporator during the defrosting period. If the control knob is left in the defrosting position a small amount of refrigeration will be produced, sufficient to maintain a safe box temperature, due to the presence of the igniting flame at the boiler, which may be larger than a bare igniting flame, and the operation of the circulating fan. If the housewife should return the control knob to normal position at the end of the defrosting period, the switch 235 would immediately be shifted to the lefthand "off" position, in Figure 6, and would not have any further active part in the control of the machine. The relationship between the actuating arms 234 and 237 is such that the springs 239 and 240 normally act as rigid connections and function only as damage preventing cushions in the event that the arm 209 should override its normal controlling position or should be moved to the defrosting position. When the arm 209 is moved to the defrosting position, the shaft 228 is shifted to the right in Figure 6 to such an extent that the lefthand shoulder of the collar 238 abuts the actuating arm 237 and the spring 240 is compressed to an appreciable extent before the switch arm 234 is moved to the right hand "off" position.

Figure 8 to 11, inclusive, illustrate a third form of our invention which will be described below. This form of the invention is adapted to be utilized with a refrigerating system of the type illustrated in Figure 1 or with a refrigerating system of the type utilizing a vapor-lift pump to circulate the absorption liquid and a fan to circulate the inert gas at high loads.

Referring to the drawings it will be seen that this control mechanism comprises a housing 300 mounted on a top plate 301 of an evaporator casing, not shown, in any suitable manner and rearwardly of an upstanding control panel 302 positioned at the front of the evaporator casing. A control shaft 303 is rotatably mounted in the front and rear walls of the housing 300 and extends through the control panel 302. The front end of the shaft 303 is provided with an integral collar 304 which bears on a hardened steel bearing washer abutting the rear face of the front wall of the housing 300. Collar 304 prevents a lateral movement of the shaft 303 forwardly of the control panel. A control knob 305 is rigidly secured in any suitable manner to the forwardly extending end of the shaft 303 and functions to prevent rearward movement of said shaft. The shaft 303 extends rearwardly of the refrigerating apparatus and carries at its outer end a drive pulley 306 to which is attached a control cable 307 in a manner well known. The control cable 307 extends downwardly to a pulley 308 rigidly mounted on the control shaft of a modulating valve 309. The valve 309 may be of any desired construction; for example, that shown in Reissue Patent 18,878 issued to F. J. Bast on June 27, 1933. The valve 309 is a thermostatic modulating valve and is provided with a thermal bulb 310 adapted to be positioned in contact with the evaporator or within the refrigerating compartment whereby the supply of gas passing through the valve is regulated in accordance with the demand for refrigeration. The bulb 310 is connected to a thermal bellows within the valve housing by means of a small conduit 311. Gas is supplied to the valve 309 through a conduit 312 from a suitable pressure regulator and is supplied from the valve 309 to a burner, such as that illustrated in Figure 1, for example, by a conduit 313.

Figure 8:
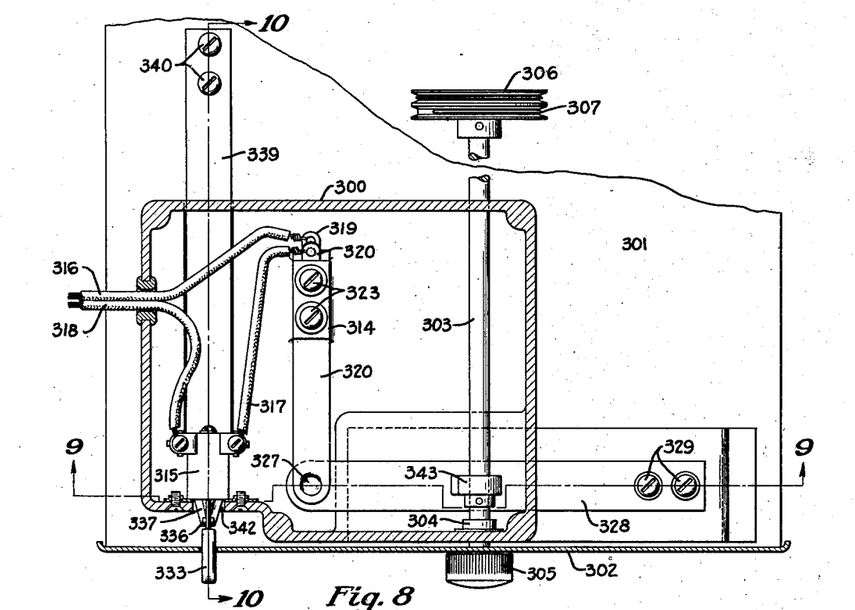
Figure 8 is a detail view illustrating a further modification of the invention.

The knob 305 may be formed in any suitable manner to cooperate with suitable indicia formed on the control panel 302 whereby the operator of the machine is appraised of the temperature setting. Rotation of the knob 305 changes the temperature setting of the valve 309 in a manner well known in the art.

The machine to be controlled is provided with an inert gas circulating fan motor in a manner similar to that illustrated in Figure 1. This motor is controlled by a switch mechanism 314 connected in series with a defrosting switch 315. One supply line from a source of current is connected directly to the motor. The other line indicated at 316 is connected directly to the thermal switch 314. The thermal switch 314 is connected by a wire 317 to the defrosting switch 315 which is connected to the circulating motor by the wire 318.

Figure 9:
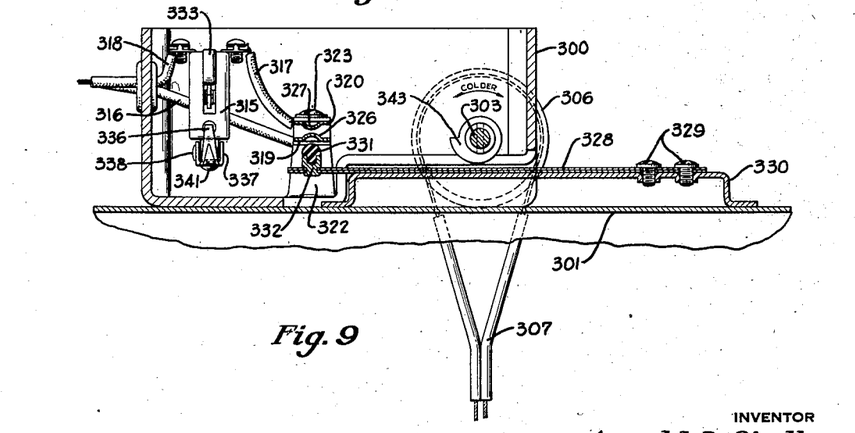
Figure 9 is a sectional view taken along the line 9—9 of Figure 8.

The switch 314 comprises a pair of metallic contact members 319 and 320, which are separated by an insulating block 321 and are rigidly supported from lug 322 formed integrally with the bottom wall of the housing 300. The switch contact arms and the insulating block 321 are attached to the lug 322 by screws 323. Suitable insulating collars and plates are provided to insulate the screws 323 from the contact arms 319 and 320 and to insulate the contact 319 from the lug 322 and the contact 320 from the head of the screws 323. As shown, these elements comprise insulating collar 324 surrounding the screws 323 and insulating plates 325 abutting the outer surfaces of the contact arms 319 and 320. The outer free ends of the switch contact arms 319 and 320 are provided with facing projections 326 and 327, respectively. These projections form the actual switch contacting portions of the contact arms.

The switch contact arms are actuated by a bimetallic thermostat 328 which is rigidly attached by means of screws 329 to a supporting bracket 330. The bracket 330 is attached to the top plate of the evaporator casing in any suitable manner and functions to elevate the bimetallic thermostat 328 thereabove. The outer free end of the bimetallic thermostat 328 is positioned beneath the contacting elements 326 and 327 and is provided with a small bearing member 331 made of insulating material which is attached to the bimetallic thermostat 328 by means of a riveted over supporting member 332.

The control shaft 303 rigidly carries a regulating cam 343 which is positioned to bear upon the bimetallic thermostat 328 to change its temperature range synchronously with the gas valve controlling thermostatic mechanism.

The defrosting switch 315, which is mounted in any suitable manner, is provided with a manual actuating arm 333 extending through a slot in the control panel 302. A torsion spring 334 urges the switch 315 to closed circuit position. The actuating arm 333 is provided with a hook-like latching element 335 which is designed to cooperate with the latching finger 336 of a pivotally mounted defrosting latch 337. The defrosting latch 337 is pivotally mounted as indicated in 338 on the underside of the defrosting switch 315. The construction is such that the latching finger 336 will engage the latch device 335 and lock the switch in open circuit position when it is manually moved to such position. The defrosting latch device 337 is released by a bi-metallic thermostat 339 rigidly attached to the top wall of the evaporator by means of screws 340. The thermostat 339 operates only when the evaporator has reached a defrosting temperature. The free end of the bimetallic thermostat 339 is positioned to abut the projection 341 formed on the defrosting latch element 337 whereby to swing the said element in a clockwise direction, as viewed in Figure 10, to release the latching engagement between the elements 336 and 335 whereby the torsion spring 334 returns the defrosting switch 315 to closed circuit position. The defrosting switch actuating arm 332 and the defrosting latch element 337 extend through a slot 342 in the front wall of housing 300. The housing 300 is also suitably cut away to receive the defrosting thermostat 339 and the normal control thermostat 328 and its supporting bracket 330.

The operation of the form of the invention just described will now be explained. During normal operation the defrosting switch remains in the closed circuit position to which it is urged by the torsion spring 334. Control of the machine is achieved by the combined action of the gas valve control and the switch 314 controlling the circulating motor. The temperature for which the mechanism is set can be varied at will by adjusting the position of the knob 305. Rotation of the knob 305 simultaneously moves the cam 343 to change the effective temperatures at which the thermostat 328 opens and closes the switch 314, and moves the cable 307 to change the temperature setting of the modulating valve.

This form of the invention may be also used with a machine of the character illustrated in Figure 1 or with a refrigerating system of the type embodying a vapor-lift pump to circulate the absorption liquid and in inert gas fan to circulate the pressure equalizing medium at high loads.

Figure 10:
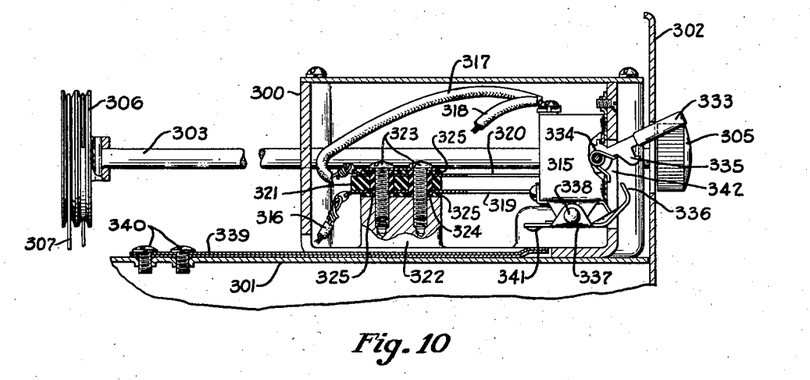
Figure 10 is a sectional view taken along the line 10—10 of Figure 8.
Figure 11:
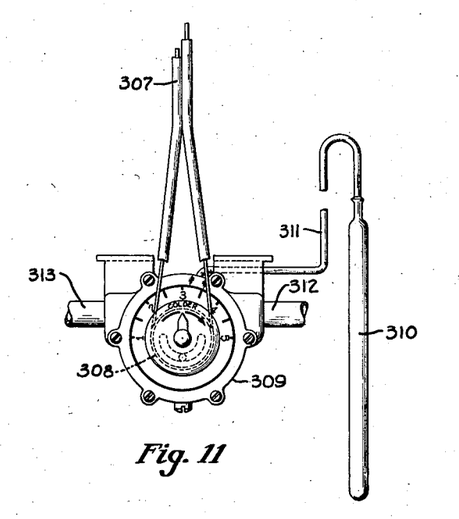
Figure 11 is a view illustrating a gas valve and its regulating mechanism which is used in conjunction with the mechanism of Figure 8.

Defrosting is accomplished by manually moving the actuating arm 333 to the "open" circuit position where it is locked by the defrosting latch 337. If the control knob 305 is permitted to remain in a position such that the machine would normally operate with low evaporator temperatures the gas burner will soon be moved to wide open position during the defrosting period. Warm liquid refrigerant will then be discharged from the condenser into the evaporator and will greatly accelerate the defrosting period. The frost from the evaporator will be melted by the warm liquid refrigerant which will collect in the evaporator and be available to reduce the box and evaporator temperatures at a very rapid rate immediately the bimetallic thermostat 339 has released latching engagement between the defrosting lockout latch 337 and the actuating arm 333 of the defrosting switch 315. If it is desired to prolong the defrosting period and to utilize the heat absorptive powers of the frost to the fullest advantage, the control knob 305 should be moved to the highest temperature setting, a setting which will normally maintain the box temperature at a safe value but which will not be sufficiently low to cause freezing of ice cubes, the machine will not then receive refrigerant from the generator until a period after the evaporator has substantially defrosted. If the control knob is left in this position, the machine will then operate at relatively high temperatures sufficient to maintain the box at a safe temperature but without freezing ice cubes. Thus it will be seen that this form of the invention will provide for a very rapid defrosting period by utilizing the warm liquid refrigerant discharged into the evaporator by the condenser or will provide for a long defrosting period utilizing the heat absorptive power of the frost to maintain the box temperature.

While we have illustrated and described several embodiments of our invention, it is to be understood that these are to be taken as illustrative only and not in a limiting sense. It is within the purview of our invention to modify the form thereof without departing from the spirit of the invention except as limited by the scope of the claims.

We claim:

1. The method of controlling an absorption refrigerating system of the type having an evaporator, a source of heat to expel refrigerant vapor from solution, and a power-driven pressure equalizing medium circulator which includes the steps of regulating the supply of heat to the generator in response to minor evaporator temperature changes, and controlling the supply of heat to the generator and the operation of the circulating means jointly in response to major evaporator temperature changes.

2. The method of controlling the operation of an absorption refrigeration system of the type having an evaporator, a condenser, an absorber, a generator, a source of heat for the generator, and a power-driven means for circulating a pressure equalizing medium connected in circuit including the steps of modulating the supply of heat to the generator in accordance with a normal demand for refrigeration, and placing the circulating means in operation in response to a high demand for refrigeration.

3. That method of producing refrigeration which includes the steps of generating refrigerant vapor by applying heat to a place of generation, liquefying the vapor, evaporating the liquid into a propelled stream of pressure equalizing medium, absorbing the refrigerant vapor by contact with an absorption medium, returning the absorption medium to the place of generation, regulating the rate of heat supply in response to demand for refrigeration to compensate for minor changes in refrigeration demand, and controlling the circulation of the pressure equalizing medium in response to major changes in refrigeration demand.

4. The method of producing refrigeration which includes the steps of producing refrigerant vapor by the application of heat to a solution of refrigerant in an absorbent, liquefying the vapor, evaporating the vapor into a circulating body of pressure equalizing medium, absorbing the vapor from the pressure equalizing medium into the absorbent, circulating the pressure equalizing medium, normally regulating the production of refrigeration by varying the rate of heat supply in accordance with the demand for refrigeration and positively propelling the pressure equalizing medium whenever the demand for refrigeration exceeds a predetermined value.

5. Refrigerating apparatus including a generator, a gas burner for heating the generator, an evaporator, a power-driven device for circulating a pressure equalizing medium through the evaporator, movable mechanism operative to control the operation of said gas burner and said power-driven device, a thermal device responsive to evaporator temperature for controlling said movable mechanism, manually adjustable means for resisting controlling movement of said thermal device, latch means adapted to lock said movable mechanism in position to discontinue operation of said gas burner and said power-driven device, the arrangement being such that said movable mechanism is moved to latching position by an abnormal movement of said manually adjustable means, and means operated by said thermal device when the evaporator has reached a defrosting temperature for releasing the latching engagement between said latch means and said movable mechanism.

6. Control apparatus comprising a temperature responsive bellows, a control element, means adapted to transmit controlling movement of said bellows to said control element, defrosting control means for holding said control element in a fixed position, means adapted to render said defrosting control means operative, and means operated by an expansive movement of said bellows in a direction not normally effective to operate said control element for releasing said defrosting control means.

7. Refrigeration control apparatus comprising a temperature responsive bellows, means adapted to govern the production of refrigeration, an actuating device positioned to transmit movement of said bellows to said governing means, a spring resisting movement of said bellows in a manner to affect said actuating device, means for regulating said spring, latch means adapted to secure said bellows in a position in which it is unable to move in a manner to affect said actuating device, and means operated by movement of said bellows in a manner not affecting said actuating device for releasing said latching device.

8. Refrigeration control apparatus comprising a switch, a gas valve, thermal responsive means connected to operate said switch and said gas valve, means for altering the temperature setting of said thermally responsive means, and means adapted to delay operation of said switch and said gas valve until said thermal device has been subjected to an abnormal temperature condition.

9. Control apparatus comprising a movable element, a thermally responsive device adapted to move said element, means movable between predetermined limits adapted to vary the characteristics of said thermal element, means set in operation by movement of said varying means beyond one of said predetermined limits adapted to prevent said thermal means from affecting said movable element, means yieldable under the stress produced by a high temperature in said thermally responsive device to allow such device to move in a direction different from its normal direction of movement, and means operated by movement of said thermally responsive device in such different direction for releasing said means for preventing movement of said movable element.

10. Defrosting mechanism comprising an expansible bellows mounted in opposing relation to a strong resisting device at one end, a relatively weak resisting device opposing the opposite end of said bellows, a movable control element operated by the end of said bellows opposed by said relatively weak resisting device, mechanism adapted to prevent operation of said bellows against said relatively weak resisting device, and means operated by movement of said bellows against said strong resisting device adapted to render said mechanism inoperative.

11. Refrigerating apparatus comprising a cooling unit, means for controlling the operation of said cooling unit, means responsive to the temperature of said cooling unit for controlling said control means, manually operated means for regulating the operative temperatures of said temperature responsive means, a defrosting mechanism including a holding device operative to prevent movement of said temperature responsive means in a manner tending to operate said control means, and a means operated by a movement of said temperature responsive means not tending to operate said control means for rendering said holding device inoperative, the arrangement being such that said holding device is rendered operative by movement of said manually operated means to an abnormal position.

12. Absorption refrigerating apparatus including a generator, a condenser, an evaporator, and an absorber connected in circuit, a gas burner adapted to heat the generator, a power-driven pressure equalizing medium circulator, control apparatus comprising a thermal device responsive to evaporator temperature operative to govern the supply of gas to said burner and to control the operation of said circulator, manually operated means for rendering said thermal device inoperative under normal conditions, and means operated by said thermal device for energizing said circulator when the evaporator has reached a defrosting temperature.

13. Refrigeration control apparatus comprising a temperature responsive device, an actuating element operated by said temperature responsive device, a gas valve, a two position switch, a three position switch, means connecting said gas valve and switches to said actuating element for operation thereby, and manually operated means for regulating the temperature range of said temperature responsive device, the arrangement being such that the gas valve may be moved to closed position and said switches may be moved to open position by said manually operated means, said thermal device being operative to move said three position switch to closed position in response to a defrosting temperature without affecting said gas valve and said two position switch.

14. Refrigerating apparatus comprising a generator, a condenser, an evaporator, and an absorber connected in circuit, a power-driven device for circulating a pressure equalizing medium in the apparatus, a gas burner for heating the generator, means providing a constant flame at the gas burner, control mechanism comprising a thermostat responsive to the demand for refrigeration, means controlled by the thermostat for governing the gas burner and the power-driven device to regulate the production of refrigeration, manually operated means for rendering the thermostat incapable of responding to normal refrigeration demands and means operated by said thermostat for energizing said power-driven device when the evaporator has defrosted whereby said constant flame and said power-driven device produce sufficient refrigeration to maintain safe temperatures after defrosting.

15. Refrigeration control apparatus comprising a fuel supply regulating mechanism, temperature responsive means controlling said fuel supply regulating mechanism, a switch mechanism, temperature responsive means controlling operation of said switch mechanism, and temperature adjusting means simultaneously regulating each of said temperature responsive means.

16. Refrigeration control apparatus comprising a fuel supply regulating mechanism, temperature responsive means controlling said fuel supply regulating mechanism, a switch mechanism, temperature responsive means controlling operation of said switch mechanism, temperature adjusting means simultaneously regulating each of said temperature responsive means, and defrosting means for rendering one of said temperature responsive means inoperative to control its associated controlled mechanism.

17. Refrigerating apparatus comprising a cooling unit, means operated in response to a supply of heat for supplying refrigerant to said cooling unit, means for circulating a pressure equalizing medium through said cooling unit, thermal responsive means adapted to control the operation of said heat source and said circulating means, manually operated means adapted to adjust the temperature range of said thermally responsive means, defrosting means for discontinuing operation of said pressure equalizing medium circulating means independently of said thermally responsive means, said thermally responsive means being adjustable to cause operation of said refrigerant supply means during defrosting to supply warm refrigerant to the evaporator to hasten defrosting thereof or to substantially prevent the supply of refrigerant to the evaporator during defrosting whereby the heat absorptive power of the frost is utilized to produce refrigeration.

18. Refrigeration control mechanism comprising a movable element adapted to control the operation of a fuel burner and a power driven device, a thermal device adapted to operate said movable element in response to temperature changes in a cooling unit, manually adjustable means for selecting controlling temperature of said thermal device, latch means adapted to lock said movable element in position to discontinue operation of said fuel burner and power driven device, the arrangement being such that said movable element is moved to latching position by an abnormal movement of said manually adjustable means, and means operated by said thermal device in response to a defrosting temperature condition on the cooling unit for eliminating the latching engagement between said latch means and said movable element.

19. Refrigerating control mechanism comprising a pressure sensitive thermostatic bellows, a manually adjustable resilient resistance means opposing movement of said bellows in one direction, a resistance element yieldable under high pressures opposing movement of said bellows in the opposite direction, a movable member operatively connected to said bellows to be operated thereby against the bias of said resilient resistance means, a latch element adapted to secure said movable member in fixed position, said movable member being movable to latched position by said manually adjustable means, and means operated by said bellows when moving against the bias of said yieldable element for unlatching said movable member.

20. Control mechanism comprising a condition responsive element, an actuating element operated by said condition responsive element, means for latching said actuating element against movement, and means actuated by an abnormal movement of said condition responsive element for releasing said latching means.

21. Control mechanism comprising a condition responsive element, an actuating element operably connected to said condition responsive element, a normally stationary means adapted to yield under a predetermined pressure and holding said condition responsive means in operative position, means for blocking normal controlling operation of said condition responsive means, and means operated by movement of said condition responsive means against said normally stationary means for disengaging said blocking means.

22. Control mechanism comprising a condition responsive element, an actuating element operably connected to said condition responsive element, a normally stationary means adapted to yield under a predetermined pressure and holding said condition responsive means in operative position, means for adjusting said condition responsive means, means for blocking normal controlling operation of said condition responsive means, and means operated by movement of said condition responsive means against said normally stationary means for disengaging said blocking means.

23. Control mechanism comprising a condition responsive element, an actuating element operably connected to said condition responsive element, a normally stationary means adapted to yield under a predetermined pressure and holding said condition responsive means in operative position, means for adjusting said condition responsive means, means put in operative condition by said manual adjusting means for blocking normal controlling operation of said condition responsive means, and means operated by movement of said condition responsive means against said normally stationary means for disengaging said blocking means.

24. Refrigeration control mechanism comprising a pressure sensitive thermostatic diaphragm, normally rigid yieldable means abutting one side of said diaphragm, energy control mechanism operatively connected to the other side of said diaphragm, manually operated means for adjusting said diaphragm, means adapted to prevent operation of said energy control mechanism by said diaphragm and set in operative condition by said manually operated means, means operated by said diaphragm when moving against said normally rigid means for shifting said means preventing operation of said energy control means into inoperative position.

25. Refrigerating control mechanism comprising a thermostatic bellows, means slidably mounting said bellows, resilient means normally preventing slidable movement of said bellows, abutment means fixing the position of said bellows under the bias of said resilient means, a controlled mechanism operatively connected to said bellows, manually adjustable means having a normal range of movement for altering the operating characteristics of said bellows, means adapted to secure said bellows and controlled mechanism in a predetermined relationship, said manually adjusting means being operable to bring said securing means into operation when moved to a selected position beyond said normal range of movement, and means for releasing said securing means operated by movement of said bellows against the bias of said resilient means.

26. Defrosting mechanism comprising a gas valve, a thermal device normally operative to control said gas valve, means operative with the gas valve closed to block movement of said thermal device tending to move said gas valve to open position, and means operated by said thermal device for releasing said blocking means in response to a defrosting temperature.

ARNOLD D. SIEDLE.
WILLIAM H. KITTO.